United States Patent
Nicholas et al.

(10) Patent No.: US 7,762,878 B2
(45) Date of Patent: Jul. 27, 2010

(54) METHOD AND SYSTEM FOR OPERATING AND PARTICIPATING IN FANTASY LEAGUES

(75) Inventors: Frank C. Nicholas, Glenview, IL (US); Ian B. Carswell, Chicago, IL (US)

(73) Assignee: Dizpersion Technologies, Inc., Evanston, IL (US)

( * ) Notice: Subject to any disclaimer, the term of this patent is extended or adjusted under 35 U.S.C. 154(b) by 304 days.

(21) Appl. No.: 11/353,920

(22) Filed: Feb. 13, 2006

(65) Prior Publication Data

US 2006/0258421 A1   Nov. 16, 2006

Related U.S. Application Data

(60) Provisional application No. 60/710,030, filed on Aug. 18, 2005, provisional application No. 60/652,283, filed on Feb. 11, 2005.

(51) Int. Cl.
*A63F 9/00* (2006.01)
(52) U.S. Cl. .......................................... 463/4
(58) Field of Classification Search ............. 463/4
See application file for complete search history.

(56) References Cited

U.S. PATENT DOCUMENTS

| | | | | |
|---|---|---|---|---|
| 4,918,603 A * | 4/1990 | Hughes et al. | ............... | 463/4 |
| 5,823,879 A * | 10/1998 | Goldberg et al. | ............... | 463/42 |
| 6,183,366 B1 * | 2/2001 | Goldberg et al. | ............... | 463/42 |
| 6,251,017 B1 * | 6/2001 | Leason et al. | ............... | 463/42 |
| 6,264,560 B1 * | 7/2001 | Goldberg et al. | ............... | 463/42 |
| 6,390,921 B1 * | 5/2002 | Busch et al. | ............... | 463/42 |
| 6,633,850 B1 * | 10/2003 | Gabbard et al. | ............... | 705/14 |
| 6,771,290 B1 * | 8/2004 | Hoyle | ............... | 715/745 |
| 6,799,327 B1 * | 9/2004 | Reynolds et al. | ............... | 725/42 |
| 7,614,944 B1 * | 11/2009 | Hughes et al. | ............... | 463/4 |
| 2002/0016194 A1 * | 2/2002 | Namba et al. | ............... | 463/3 |
| 2002/0035509 A1 * | 3/2002 | Amano et al. | ............... | 705/14 |
| 2002/0082073 A1 * | 6/2002 | Howson | ............... | 463/17 |
| 2002/0107058 A1 * | 8/2002 | Namba et al. | ............... | 463/3 |
| 2002/0123399 A1 * | 9/2002 | Conley | ............... | 473/588 |
| 2003/0014530 A1 * | 1/2003 | Bodin et al. | ............... | 709/231 |
| 2003/0016618 A1 * | 1/2003 | Alderdice et al. | ............... | 369/283 |
| 2003/0017863 A1 * | 1/2003 | Takahashi et al. | ............... | 463/3 |
| 2003/0054885 A1 * | 3/2003 | Pinto et al. | ............... | 463/42 |
| 2004/0043810 A1 * | 3/2004 | Perlin et al. | ............... | 463/16 |
| 2004/0260574 A1 * | 12/2004 | Gross | ............... | 705/1 |
| 2004/0268398 A1 * | 12/2004 | Fano et al. | ............... | 725/88 |
| 2005/0076362 A1 * | 4/2005 | Dukes et al. | ............... | 725/46 |
| 2005/0239549 A1 * | 10/2005 | Salvatore et al. | ............... | 463/42 |
| 2006/0015923 A1 * | 1/2006 | Chuah et al. | ............... | 725/135 |
| 2006/0026067 A1 * | 2/2006 | Nicholas et al. | ............... | 705/14 |
| 2006/0183547 A1 * | 8/2006 | McMonigle | ............... | 463/40 |

(Continued)

*Primary Examiner*—Peter DungBa Vo
*Assistant Examiner*—Seng Heng Lim

(57) ABSTRACT

A fantasy server system operates a fantasy league including at least one fantasy player whereby one or more fantasy client devices participate in the fantasy league. In operation, the fantasy server system manages fantasy player information of a fantasy player and sponsorship information of the fantasy player on at least one of an individual basis and a team basis. The fantasy server system additionally associates a portion or an entirety of the sponsorship information of the fantasy player to a portion or an entirety of fantasy player information of the fantasy player when presenting both types of information to fantasy client device(s). The association can be feed formatted content and/or a subfeed formatted content.

20 Claims, 13 Drawing Sheets

U.S. PATENT DOCUMENTS

| | | | |
|---|---|---|---|
| 2006/0183548 A1* | 8/2006 | Morris et al. | 463/42 |
| 2006/0217198 A1* | 9/2006 | Johnson | 463/40 |
| 2006/0232057 A1* | 10/2006 | Dome | 283/56 |
| 2007/0050270 A1* | 3/2007 | Morgan | 705/27 |
| 2008/0026804 A1* | 1/2008 | Baray et al. | 463/9 |
| 2008/0096664 A1* | 4/2008 | Baray et al. | 463/42 |
| 2008/0102911 A1* | 5/2008 | Campbell et al. | 463/9 |

* cited by examiner

METHOD AND SYSTEM FOR OPERATING AND PARTICIPATING IN FANTASY LEAGUES

RELATED APPLICATION DATA

This application claims the benefit of U.S. Provisional Application Ser. No. 60/652,283 filed on Feb. 11, 2005. This application claims the benefit of PCT Serial No. PCT/US2005/027659 filed Aug. 4, 2005, and U.S. Patent Application Ser. No. 60/710,030 filed Aug. 18, 2005. The entirety of each application is hereby incorporated by reference.

FIELD OF THE INVENTION

The present invention generally relates to any type of fantasy league (e.g., sports fantasy leagues). The present invention specifically relates to operating various aspects of a fantasy league in view of facilitating sponsorship of each fantasy player on an individual basis and/or a team basis, and in view of facilitating a transmission of feed formatted content and subfeed formatted content between fantasy systems.

BACKGROUND OF THE INVENTION

A fantasy league is primarily operated by a fantasy server system based on a particular format for facilitating player/team management by one or more fantasy client devices in view of a statistical scoring system for determining a winner among members of a fantasy league supported by the fantasy client devices. For example, a football fantasy server system will provide access by fantasy client devices to a fantasy website for facilitating, among other things, player drafts, player trading, waiver wires, free agent acquisitions and starting lineup selections in view of a statistical scoring system that is based on each football player's weekly performance as a function of the football player's position.

A fantasy league is secondarily operated by the fantasy server system based on a particular format for providing access to fantasy player information by the fantasy client devices that enhances player/team management by each member of the fantasy league supported by the fantasy client devices. For example, a football fantasy server system currently provides access by fantasy client devices to a fantasy website managing fantasy player information in the form of reports, articles, commentaries, statistics and the like that is related, directly and indirectly, to past, present and future performances of football players whereby the information is intended to serve as a guide for player/team management by each member of the fantasy football league supported by the fantasy client devices.

Over the years since the earliest creation of fantasy server systems, efforts by designers of the fantasy server systems to realize comprehensive sponsorship of fantasy players has been meet with limited success. The present invention significantly advances that state-of-art in sponsored fantasy server operation and fantasy client participation in fantasy leagues.

Furthermore, a transmission of fantasy player information of a fantasy player from a fantasy server system to a fantasy client device has historically involved limited types of information. The present invention also significantly advances the state-of art in fantasy player information of a fantasy player provided to a fantasy client device.

SUMMARY OF THE INVENTION

One form of the present invention is a fantasy server system for operating a fantasy league including at least one fantasy player. The fantasy server system comprises means for managing fantasy player information of a fantasy player, means for managing sponsorship information of the fantasy player on at least one of an individual basis and a team basis, and means for associating at least a portion of the sponsorship information of the fantasy player to at least a portion of the fantasy player information of the fantasy player A second form of the present invention a fantasy client device for participating in a fantasy league including at least one fantasy player. The fantasy client device comprises means for transmitting a fantasy client request to a fantasy server system, and means for receiving an association by the fantasy server system of at least a portion of sponsorship information of a fantasy player to at least a portion of fantasy player information of the fantasy player on at least one of an individual basis and a team basis in response to a transmission of the fantasy client request.

A third form of the present invention is a fantasy server system for operating a fantasy league including at least one fantasy player. The fantasy server system comprises means for managing fantasy player information of a fantasy player, wherein the fantasy player information includes at least one of image data, video data, audio data, multimedia data, and hyperlink data. The fantasy server system further comprises means for transmitting at least a portion of the fantasy player information at least partially as at least one of feed formatted content and subfeed formatted content to a fantasy client device A fourth form of the present invention is a fantasy client device for participating in a fantasy league including at least one fantasy player. The fantasy client device comprises means for transmitting to a fantasy client request to a fantasy server system, and means for receiving fantasy player information of the fantasy player at least partially as at least one of feed formatted content and subfeed formatted content from the fantasy server system in response to a transmission to the fantasy client request to the fantasy server system. The fantasy player information includes at least one of image data, video data, audio data, multimedia data, and hyperlink data.

The aforementioned forms and other forms as well as objects and advantages of the present invention will become further apparent from the following detailed description of various embodiments of the present invention read in conjunction with the accompanying drawings. The detailed description and drawings of the various embodiments of the present invention are merely illustrative of the present invention rather than limiting, the scope of the present invention being defined by the appended claims and equivalents thereof.

DETAILED DESCRIPTION OF THE PRESENT INVENTION

Figure 1:
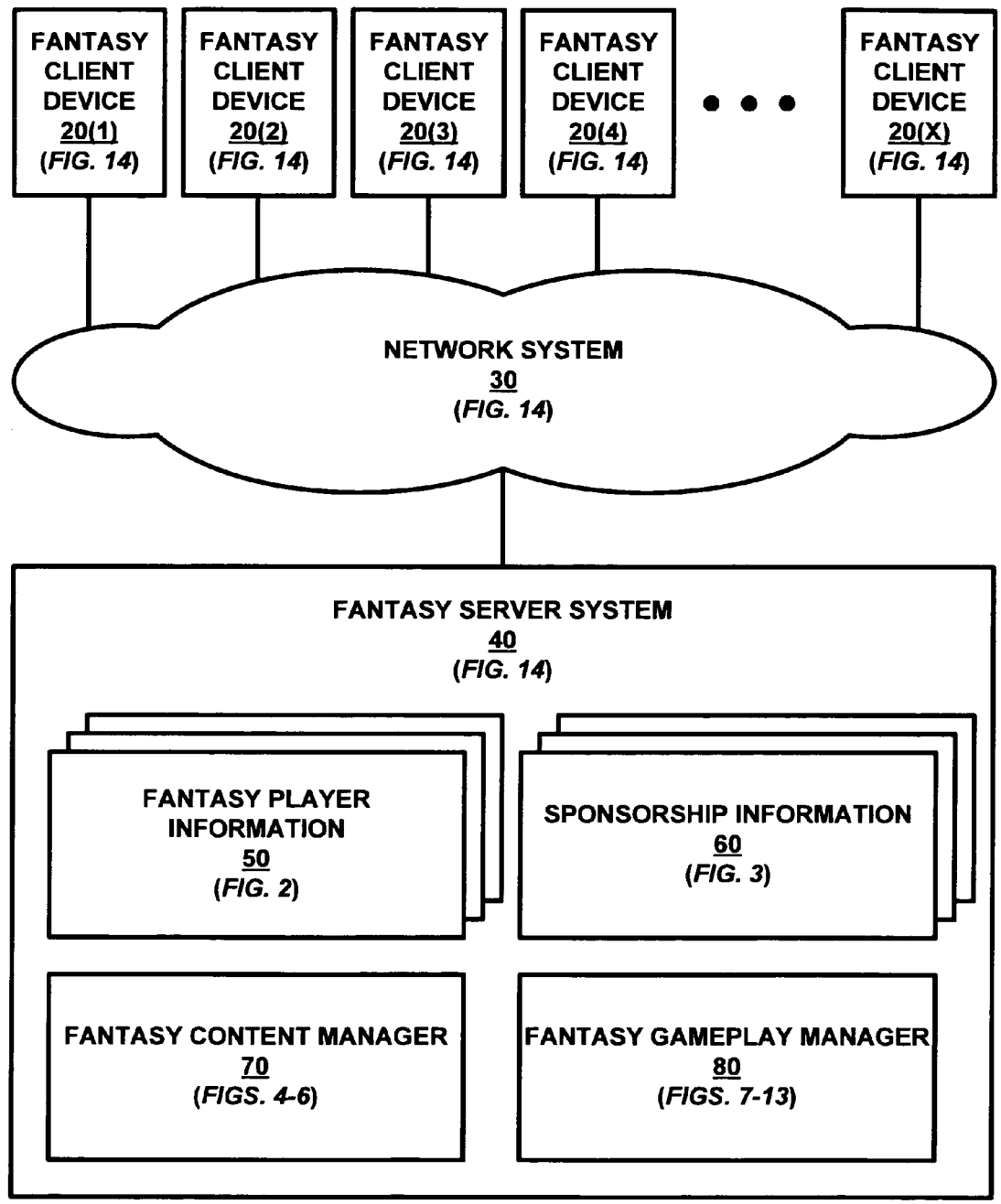
FIG. 1 illustrates an exemplary environment for practicing the present invention.

FIG. 1 illustrates a network based environment employing an X number of fantasy client device 20, where X≧1, a network system 30 and a fantasy server system 40. For purposes of the present invention, the term "fantasy client device" is broadly defined herein as a device of any type structurally configured to facilitate member participation in a fantasy league of any type that is operated by a fantasy server system of the present invention, the term "network system" is broadly defined herein as one network of any type or an interconnect array of networks of any type, and the term "fantasy server system" is broadly defined herein as one or more servers of any type structurally configured to operate the fantasy league.

In operation, network system 30 facilitates bi-directional communication between fantasy client devices 20 and fantasy server system 40 involving access by fantasy client devices 20 to the fantasy league operated by fantasy server system 40. One operational aspect of the fantasy league as provided by fantasy server system 40 is directed to facilitating access to fantasy content by fantasy client devices 20 and facilitating fantasy game play by fantasy client devices 20 as would be appreciated by those having ordinary skill in the art. Examples of this operational aspect include, but are not limited to, (1) off-season actions by fantasy client devices 20 (e.g., configuring the fantasy league, accessing pre-season rankings of fantasy players and conducting a draft of the fantasy players), (2) in-season, off-time actions by fantasy client devices 20 (e.g., managing a lineup prior to or subsequent to real-time performances by the fantasy players, and accessing reports of past performances by the fantasy players and commentaries on predicted future performances of the fantasy players), and (3) in-season, gameplay actions by fantasy client devices 20 (e.g., managing a lineup during real-time performances by the fantasy players, and accessing reports of real-time performances and real-time playing status of the fantasy players).

A new and unique operational aspect of the fantasy league in accordance with the present invention as provided by fantasy server system 40 is directed to a realization of a comprehensive sponsorship of fantasy players on an individual basis and/or a team basis with an improved exchange of fantasy content between fantasy client devices 20 and fantasy server system 40. To this end, as shown in FIG. 1, fantasy server system 40 manages one or more records of fantasy player information 50 and one or more records of sponsorship information 60, and employs a fantasy content manager 70 and fantasy gameplay manager 80.

Figure 2:
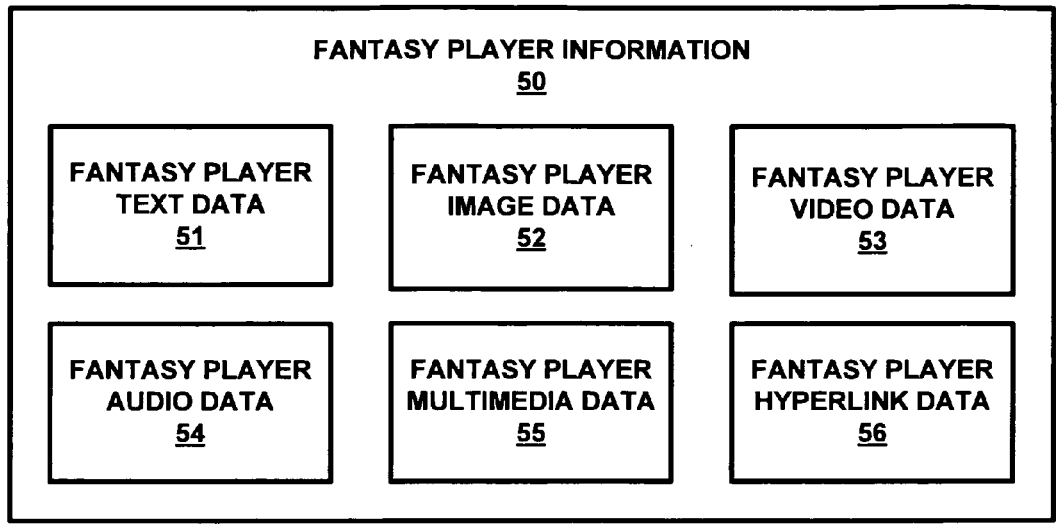
FIG. 2 illustrates one embodiment of fantasy player information in accordance with the present invention.
Figure 3:
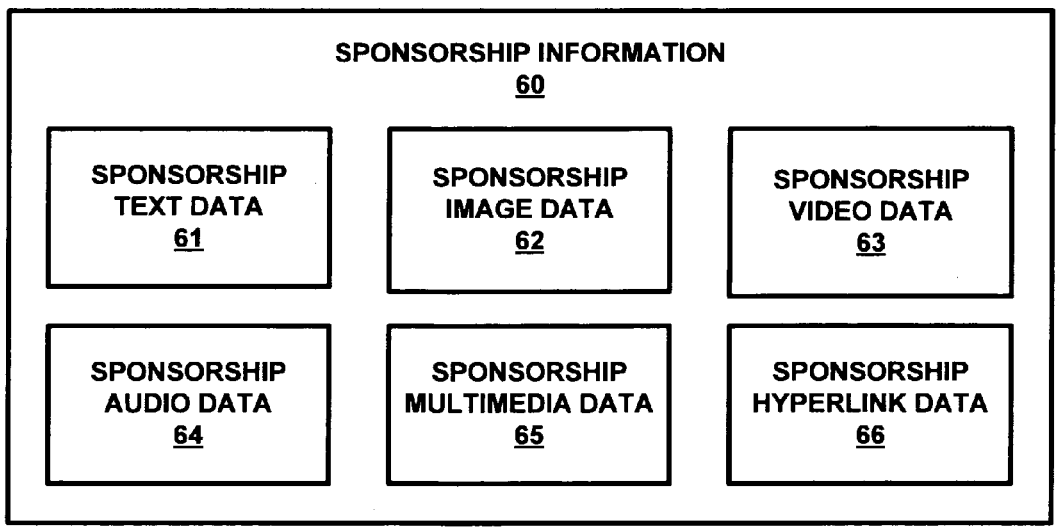
FIG. 3 illustrates one embodiment of sponsorship information in accordance with the present invention.

For purposes of the present invention, the term "fantasy player information" is broadly defined herein as any information of any type that is relevant, directly or indirectly, to a gameplay and performance history of a fantasy player as reviewed by a member of the fantasy league (e.g., physical dimensions, statistics, injury history/status, ranking, recommendations, etc.). In one embodiment, as shown in FIG. 2, fantasy player information 50 is managed by fantasy server system 40 in the form of fantasy player text data 51, fantasy player image data 52, fantasy player video data 53, fantasy player audio data 54, fantasy player multimedia data 55 and fantasy player hyperlink data 56.

For purposes of the present invention, the term "sponsorship information" is broadly defined herein as any information of any type that is relevant to an advertisement/promotion of good(s) and/or service(s) as designated to a fantasy player on an individual basis and/or a team basis, the term "individual basis" is broadly defined herein as a designation by a sponsor of an advertisement/promotion of good(s) and/or service(s) to a specific player (e.g., Indianapolis Star designates the promotion of its paper to Peyton Manning, quarterback of the Indianapolis Colts), and the term "team basis" is broadly defined herein as a designation by a sponsor of an advertisement/promotion of good(s) and/or service(s) to a specific team (e.g., Indianapolis Star designates the promotion of its paper to all of the team members of the Indianapolis Colts). Similarly, in one embodiment, as shown in FIG. 2, sponsorship information 60 is managed by fantasy server system 40 in the form of sponsorship text data 61, sponsorship image data 62, sponsorship video data 63, sponsorship audio data 64, sponsorship multimedia data 65 and sponsorship hyperlink data 66.

In operation, fantasy content manger 70 associates relevant portions of sponsorship information of a fantasy player to relevant portions of fantasy player information of the fantasy player as needed. In particular, fantasy content manger 70 associates relevant portions of sponsorship information of a fantasy player to relevant portions of fantasy player information of the fantasy player in response to fantasy client requests directed to primarily acquiring fantasy player information for purposes of (1) learning/reviewing fantasy player information to thereby make informed gameplay decisions concerning the fantasy player and (2) make recommendations of the fantasy player to another member of the fantasy league. Similarly, fantasy gameplay manger 80 associates relevant portions of sponsorship information of a fantasy player to relevant portions of fantasy player information of the fantasy player in response to fantasy client requests directed to primarily acquiring fantasy player information for purposes of (1) conducting transactions involving a fantasy player prior to and/or during a fantasy performance period of the fantasy player (e.g., drafting, acquiring, releasing, trading, and lineup substitutions) and (2) monitoring a scoring of the fantasy player during a fantasy performance period of the fantasy player.

The following description of FIGS. 4-14 are directed to describing exemplary fantasy client requests scenarios to facilitate an understanding of the present invention by those having ordinary skill in the art.

Figure 4:
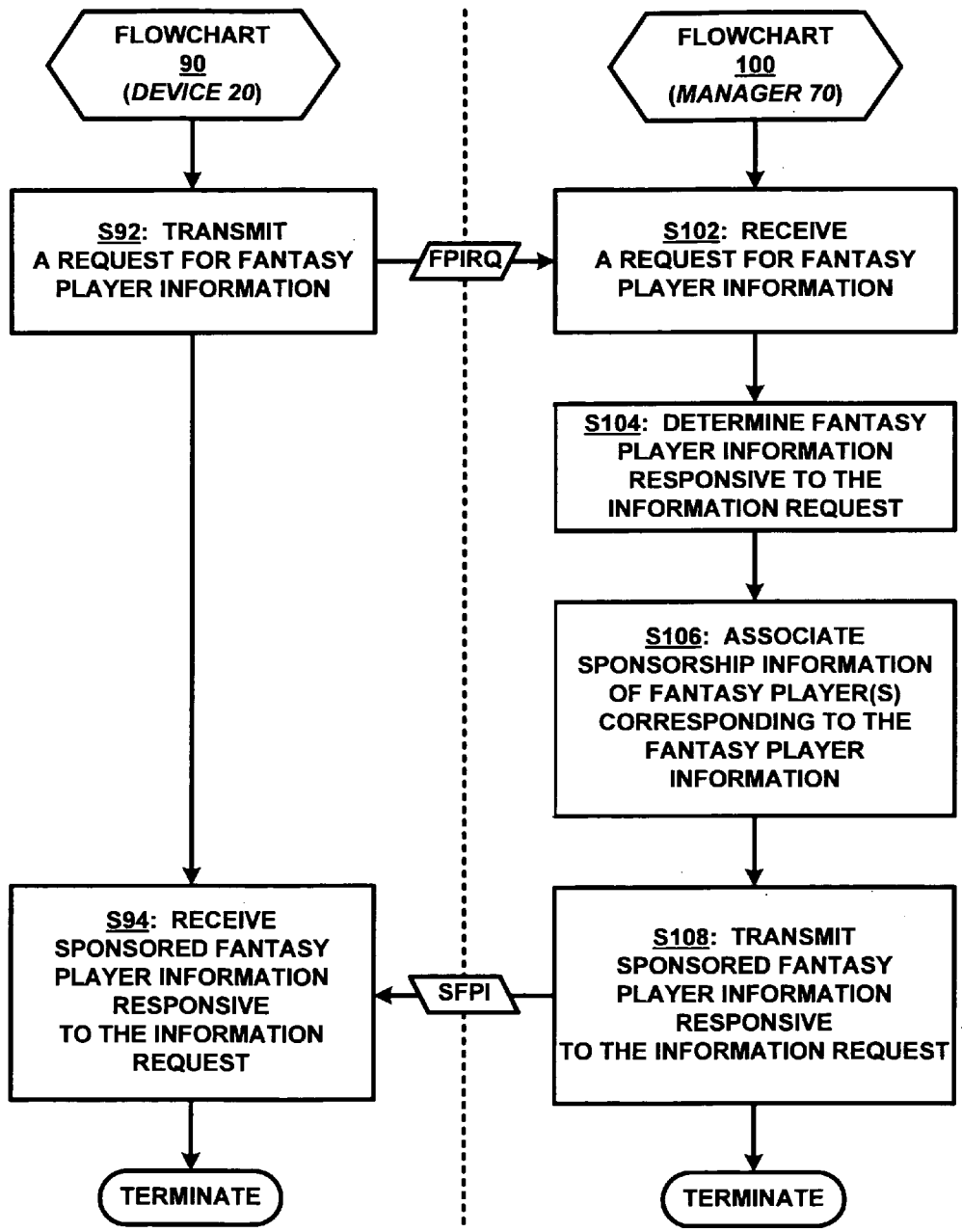
FIG. 4 illustrates a first embodiment of a flowchart representative of a fantasy client request method in accordance with the present invention.

FIG. 4 depicts a fantasy client request in the form of a request for fantasy player information. Specifically, a stage S92 of a flowchart 90 and a stage S102 of a flowchart 100 encompasses one of the fantasy client devices 20 and fantasy content manger 70 exchanging a request for fantasy player information FPIRQ of one or more fantasy players (e.g., a request for player news for Peyton Manning). A stage S104 of flowchart 100 encompasses fantasy content manager 70 determining fantasy player information of fantasy player(s) responsive to the information request (e.g., statistics and news feed items regarding Peyton Manning). A stage S106 of flowchart 100 encompasses fantasy content manager 70 associating sponsorship information of the fantasy players(s) corresponding to the fantasy player information (e.g., associating an advertisement/promotion of Indianapolis star in text, image, audio, video, multimedia, or hyperlink form to Peyton Manning's statistics and news feed items). Finally, a stage S94 of flowchart 90 and a stage S108 of flowchart 100 encompasses the fantasy client device 20 and fantasy content manger 70 exchanging the sponsored fantasy football player information SFPI.

Figure 5:
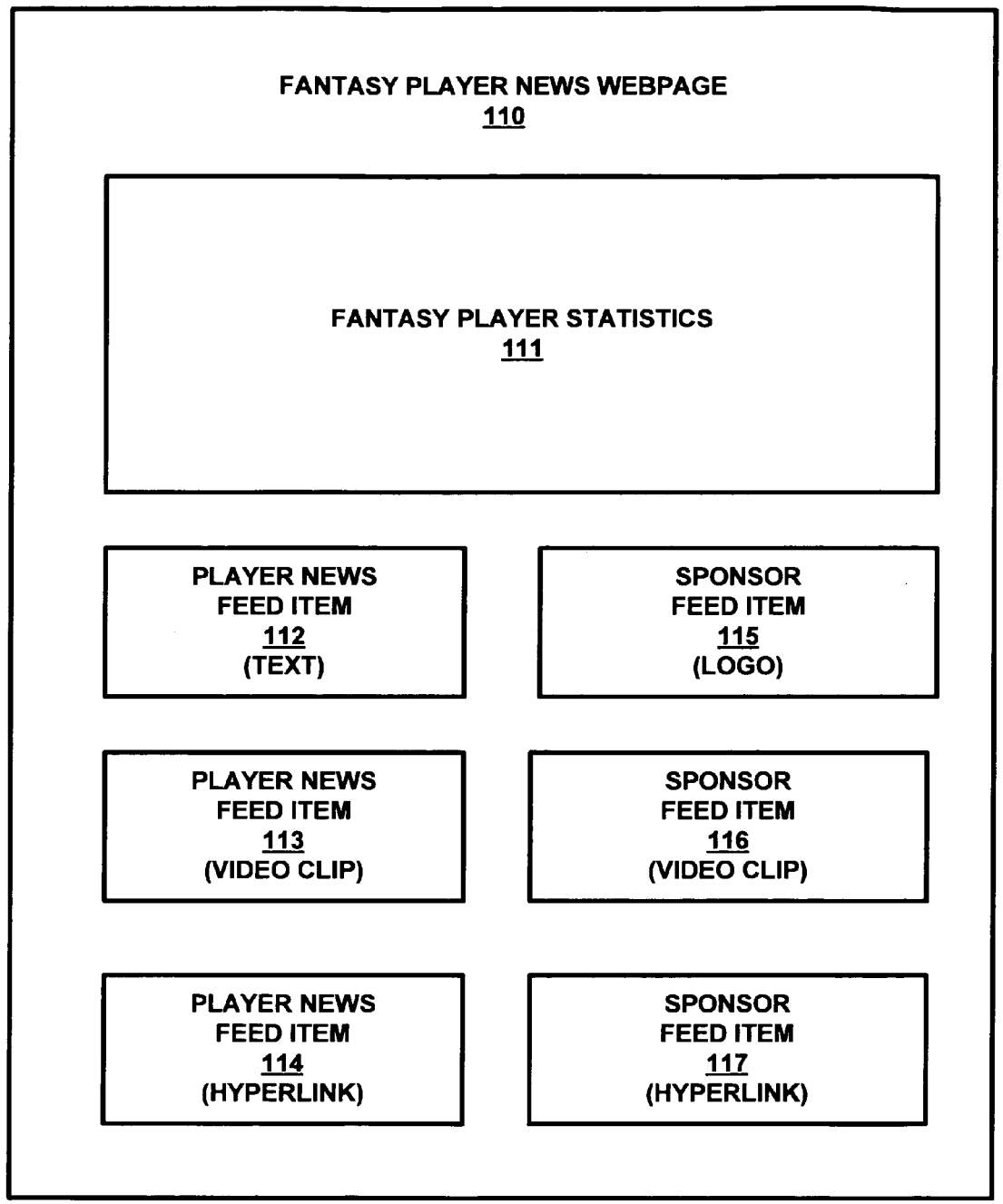
FIG. 5 illustrates a first embodiment of a web page in accordance with the present invention.

The present invention does not impose any limitations or any restrictions to the format of the sponsored fantasy player information. FIG. 5 illustrates an exemplary fantasy player news web page 110 as the form of the sponsored fantasy football player information SFPI provided to the fantasy client device 20. As shown, fantasy player statistics 111 and three (3) player news feed items 112-114 are provided on webpage 110. A sponsor logo feed item 115 is displayed adjacent a player news feed item 112 in text form. A playable sponsor video clip feed item 116 is displayed adjacent player news feed item 113 in video clip form. And a sponsor hyperlink feed item 117 is displayed adjacent players news feed item 114 in hyperlink form.

In view of the applications referenced in paragraph [0001] herein, those having ordinary skill in the art will appreciate feed formatted content is structured data, such as, for example Electronic Data Interchange (EDI), Extensible Markup Language (XML), or a subset of a general format such as RSS (Rich Site Summary or Really Simple Syndication), a hybrid or extension of some such standard, or the like. Feed formatted content may be accessed through a feed, stored in a local file, or the like of fantasy client device 20. The aforementioned feed items are the data corresponding to the feed formatted content of webpage 110. Concurrently or alternatively, subfeed formatted content in the form of a browser window or frame spawned by feed items can also be provided for webpage 110.

In practice, the three sponsor items 115-117 can correspond to the same or difference sponsors. Furthermore, for a subsequent request for the same fantasy player information, new sponsorship information can be associated with the fantasy player information. In one embodiment, this is accomplished by implementing a technique for associating the sponsorship information of fantasy players to the fantasy player information of the fantasy players based on sponsorship selection criteria including, but not limited to, ad-targeting based criteria, profile based criteria, event based criteria and time based criteria as would be appreciated by those having ordinary skill in the art in view of the applications referenced in paragraph [0001] herein.

Figure 6:
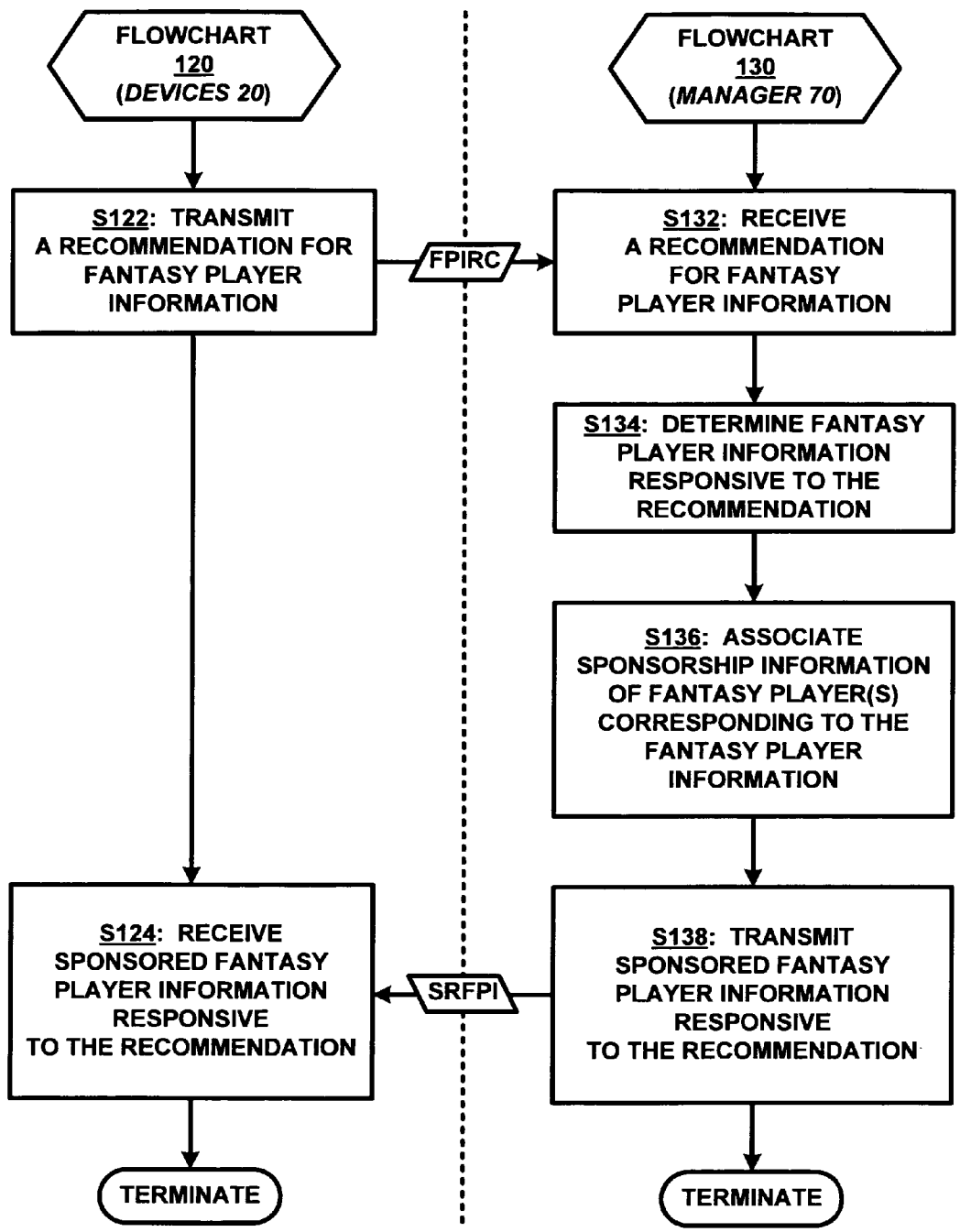
FIG. 6 illustrates a second embodiment of a flowchart representative of a fantasy client request method in accordance with the present invention.

FIG. 6 depicts a fantasy client request in the form of a recommendation of fantasy player information. Specifically, a stage S122 of a flowchart 120 and a stage S132 of a flowchart 130 encompasses one of the fantasy client devices 20 and fantasy content manger 70 exchanging a recommendation for fantasy player information FPIRC of one or more fantasy players (e.g., a recommendation for player news for Peyton Manning) to be transmitted to another one of the fantasy client devices 20). A stage S134 of flowchart 130 encompasses fantasy content manager 70 determining fantasy player information of fantasy player(s) responsive to the information recommendation (e.g., statistics and news feed items regarding Peyton Manning). A stage S136 of flowchart 130 encompasses fantasy content manager 70 associating sponsorship information of the fantasy players(s) corresponding to the fantasy player information (e.g., associating an advertisement/promotion of Indianapolis star in text, image, audio, video, multimedia, or hyperlink form to Peyton Manning's statistics and news feed items). Finally, a stage S124 of flowchart 120 and a stage S138 of flowchart 130 encompasses the intended fantasy client device 20 and fantasy content manger 70 exchanging the sponsored recommended fantasy football player information SRFPI.

A fantasy player recommendation webpage can be similarly structured to fantasy player news web page 110 as shown in FIG. 5.

Figure 7:
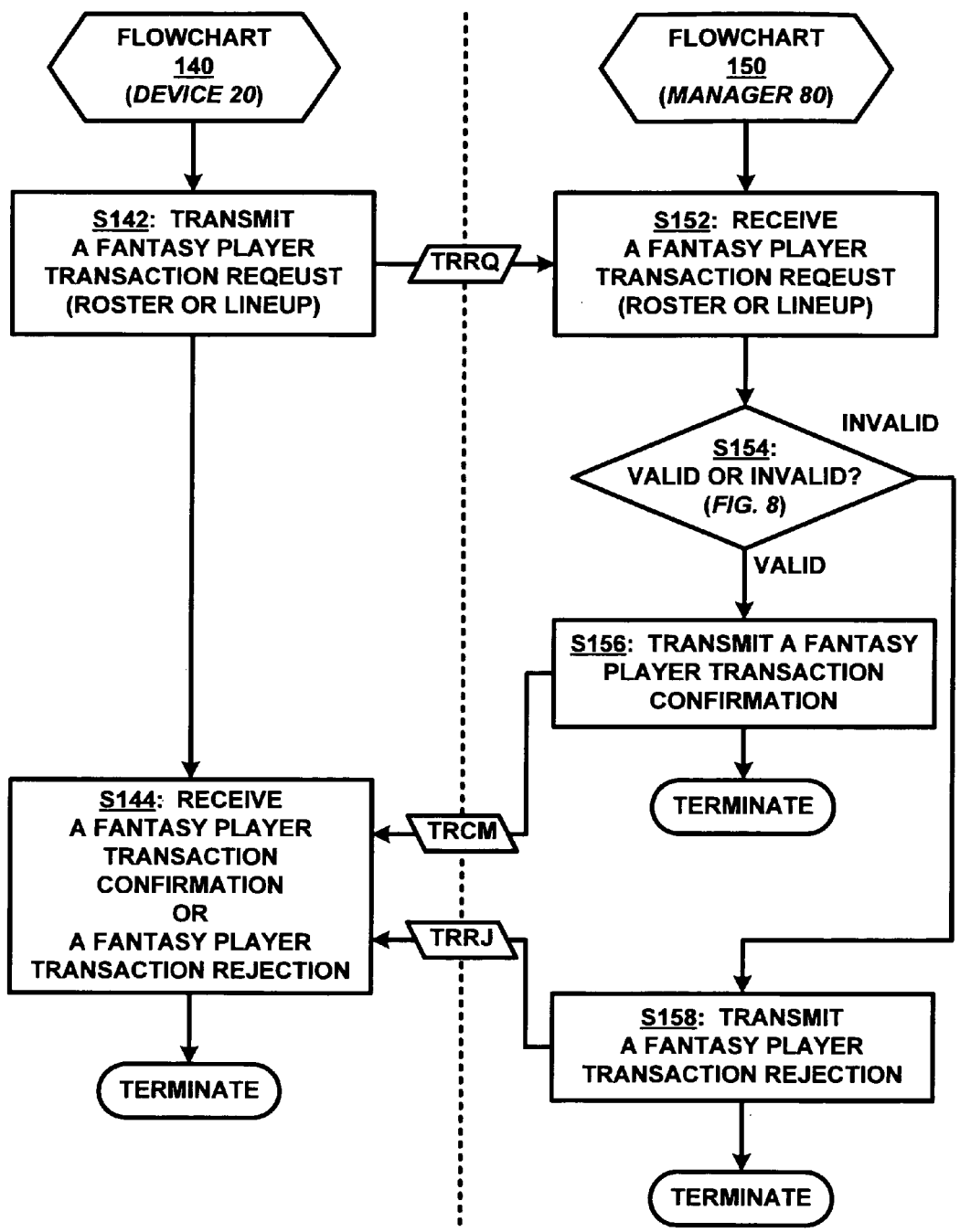
FIG. 7 illustrates a third embodiment of a flowchart representative of a fantasy client request method in accordance with the present invention.
Figure 8:
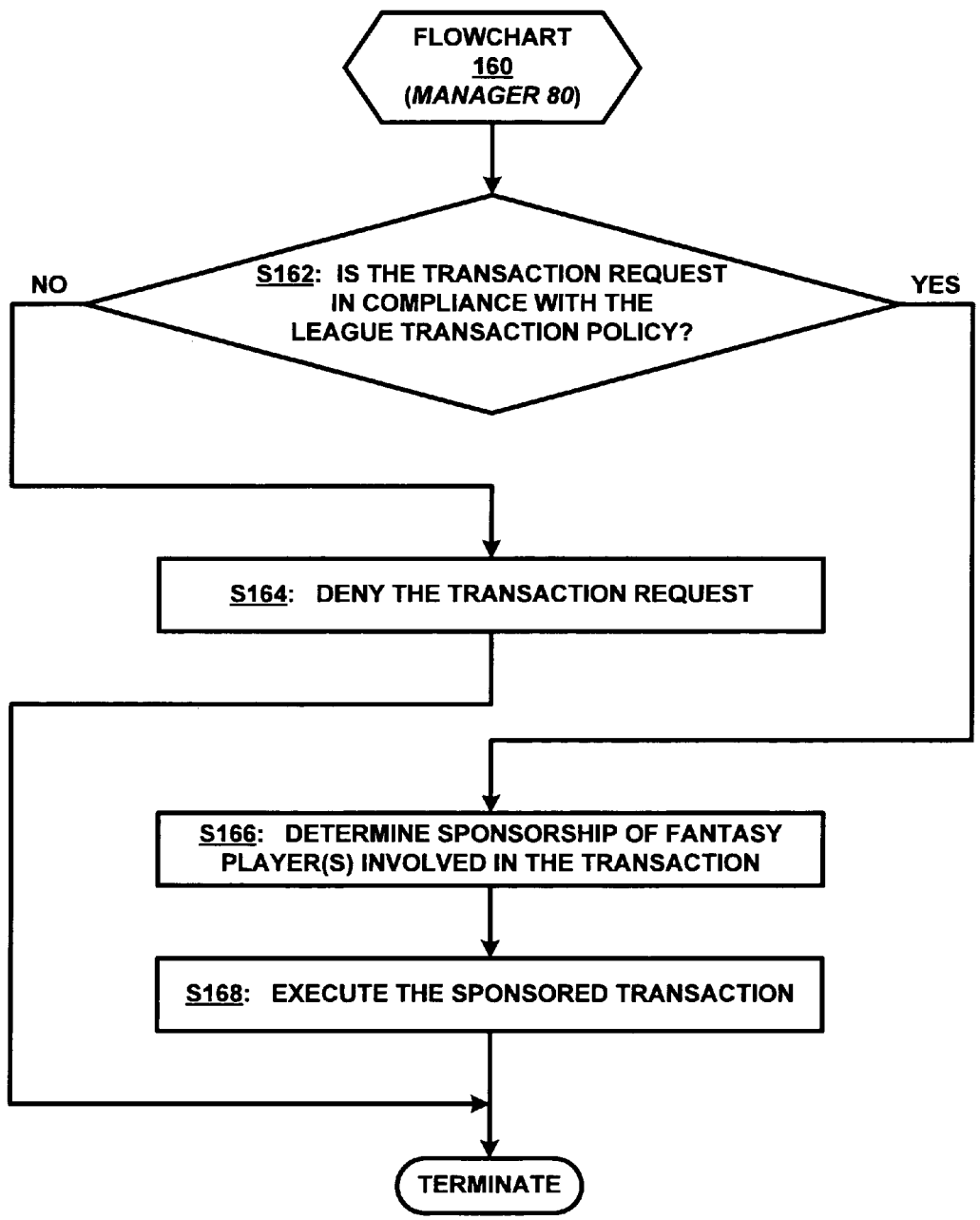
FIG. 8 illustrates one embodiment of a flowchart representative of a transaction validation method in accordance with the present invention.

FIG. 7 depicts a fantasy client request in the form of a fantasy player transaction request. Specifically, a stage S142 of a flowchart 140 and a stage S152 of a flowchart 140 encompasses a fantasy client device 20 and fantasy gameplay manger 80 exchanging a fantasy player transaction request TRRQ involving one or more fantasy players (e.g., a drafting, a waiver addition, a waiver release, a free agent addition, a free agent release and a trade involving one or more fantasy players). A stage S154 of flowchart 150 encompasses fantasy gameplay manager 80 determining whether the fantasy player transaction request is valid or invalid.

In one embodiment, a stage S162 of a flowchart 60 encompasses fantasy gameplay manager 80 determining whether the fantasy player transaction request is in compliance with the fantasy league transaction policy. For example, such a policy may specify one or more transaction time periods and which types of transactions are legal and which types are illegal during each transaction time period (e.g., trading can only occur from Monday to Friday during each week of the fantasy season and a waiver addition can only occur after three days from a fantasy player's waiver release). The fantasy player transaction request is denied during a stage S164 of flowchart 160 if it is determined by fantasy gameplay manager 80 not to be in compliance with the fantasy league transaction policy. Otherwise, fantasy gameplay manager 80 associates relevant portions of sponsorship information of the subject fantasy player(s) to the relevant portions fantasy player information of the subject fantasy player(s) during a stage S166 of flowchart 160, and executes the sponsored transaction during a stage S168 of flowchart 160.

Figure 9:
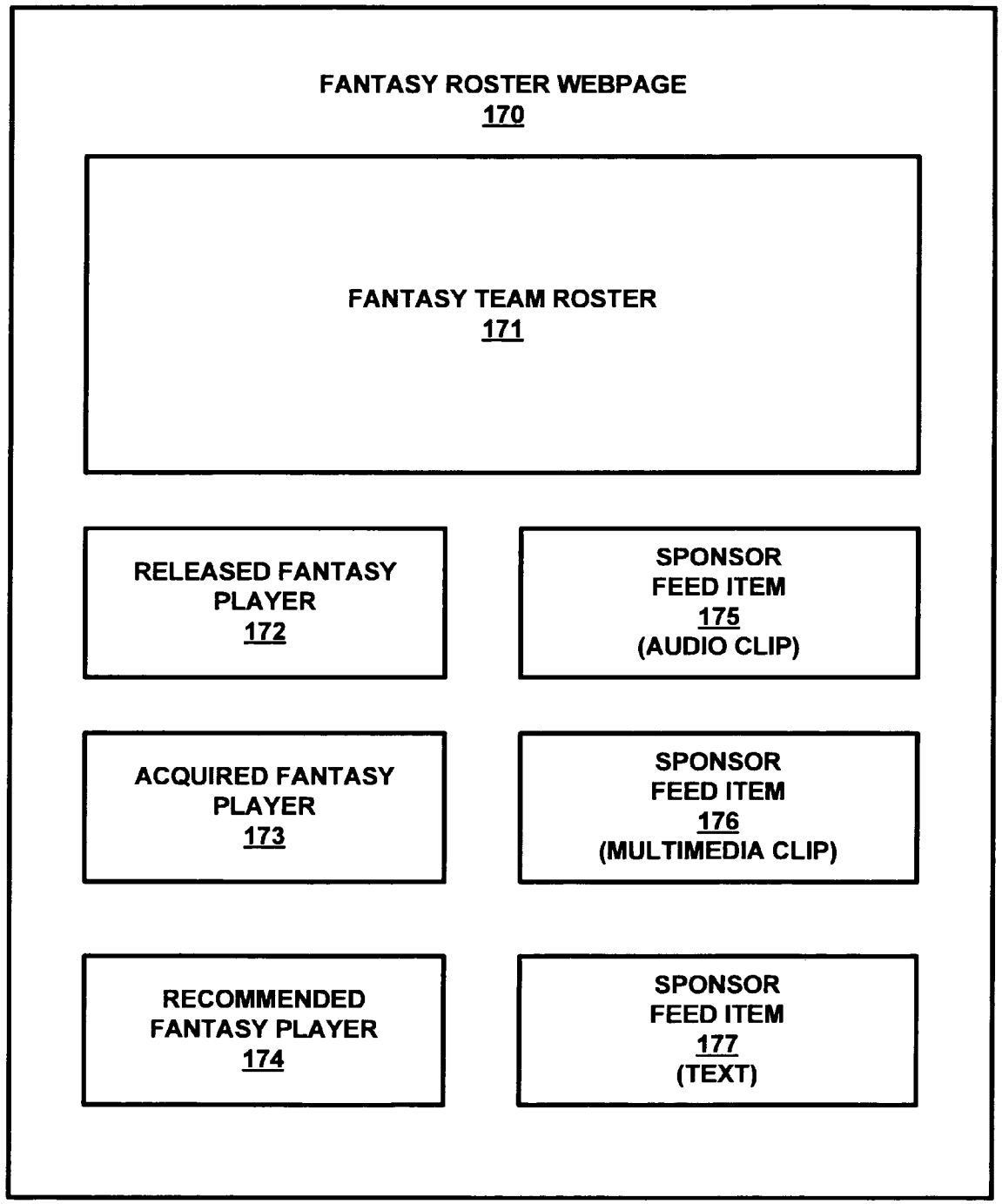
FIG. 9 illustrates a second embodiment of a web page in accordance with the present invention.

In one embodiment, an execution of the sponsored transaction invokes a generation by fantasy gameplay manager 80 of one or more webpages related to the sponsored transaction. FIG. 9 illustrates an exemplary fantasy roster webpage 170 generated in response to a sponsored transaction. As shown, a fantasy team roster 171 is provided on webpage 170. Provided below roster 171, a released fantasy player hyperlink 172 and an associated sponsor audio clip feed item 175 are displayed. Next, an acquired fantasy player hyperlink 173 and an associated sponsor multimedia clip feed item 176 are displayed. Finally, a recommended fantasy player hyperlink 174 and an associated sponsor text feed item 177 are displayed.

Referring again to FIG. 7, a stage S144 of flowchart 140 and a stage S168 of flowchart 160 encompasses the intended fantasy client device 20 and fantasy content manger 70 exchanging a fantasy player transaction confirmation TRCM for an executed sponsored transaction, or alternatively, stage S144 of flowchart 140 and a stage S168 of a flowchart 160 encompasses the intended fantasy client device 20 and fantasy content manger 70 exchanging a fantasy player transaction rejection TRRF for an a denied transaction request.

Figure 10:
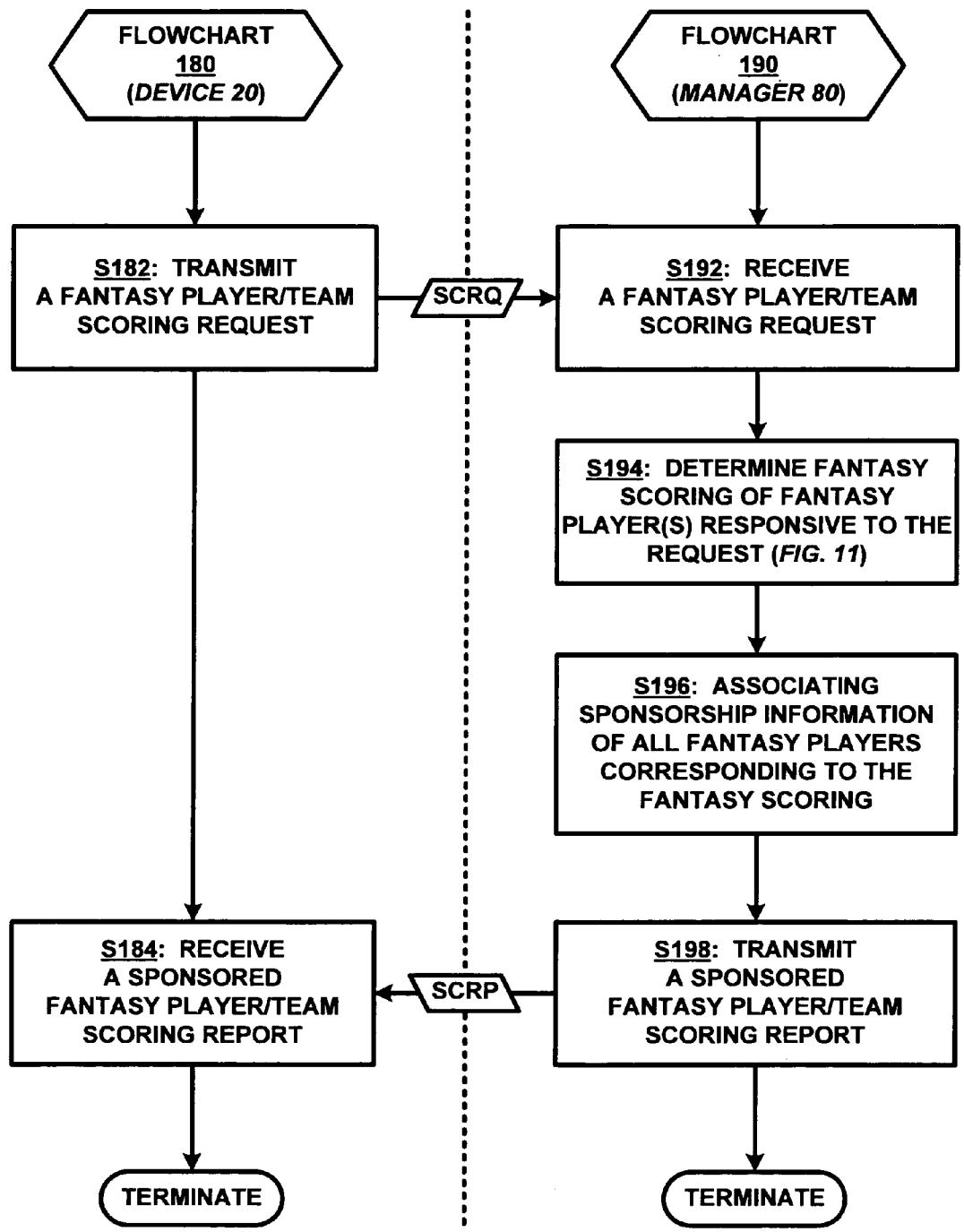
FIG. 10 illustrates a fourth embodiment of a flowchart representative of a fantasy client request method in accordance with the present invention.
Figure 11:
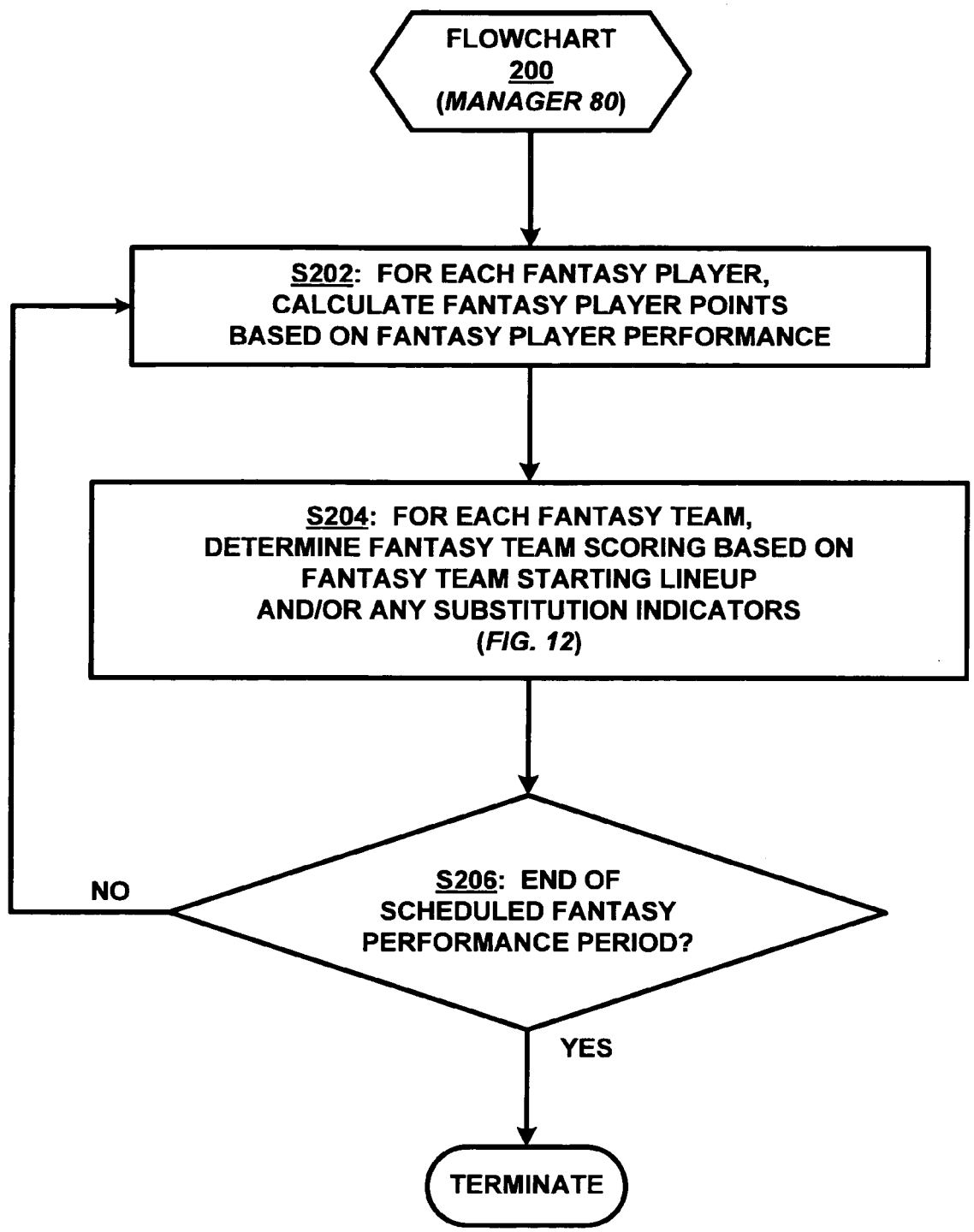
FIG. 11 illustrates one embodiment of a flowchart representative of a fantasy scoring method in accordance with the present invention.

FIG. 10 depicts a fantasy client request in the form of a fantasy player/team scoring request. Specifically, a stage S182 of a flowchart 180 and a stage S192 of a flowchart 190 encompasses a fantasy client device 20 and fantasy gameplay manger 80 exchanging a fantasy scoring request SCRQ involving an individual fantasy player or a team of fantasy players. A stage S194 of flowchart 190 encompasses fantasy gameplay manager 80 determining a fantasy scoring of each fantasy player responsive to the request.

In one embodiment, a stage S202 of a flowchart 200 encompasses fantasy gameplay manager 80 calculating fantasy player points in accordance with a league scoring policy based on fantasy player performance in real-time in relation to a schedule fantasy performance period. A stage S204 of flowchart 200 encompasses fantasy gameplay manager 80 determining fantasy team scoring based on a fantasy team starting lineup and any substitution indicators. Stages S202 and S204 are continually updated until such time the scheduled fantasy performance period has ended.

Figure 12:
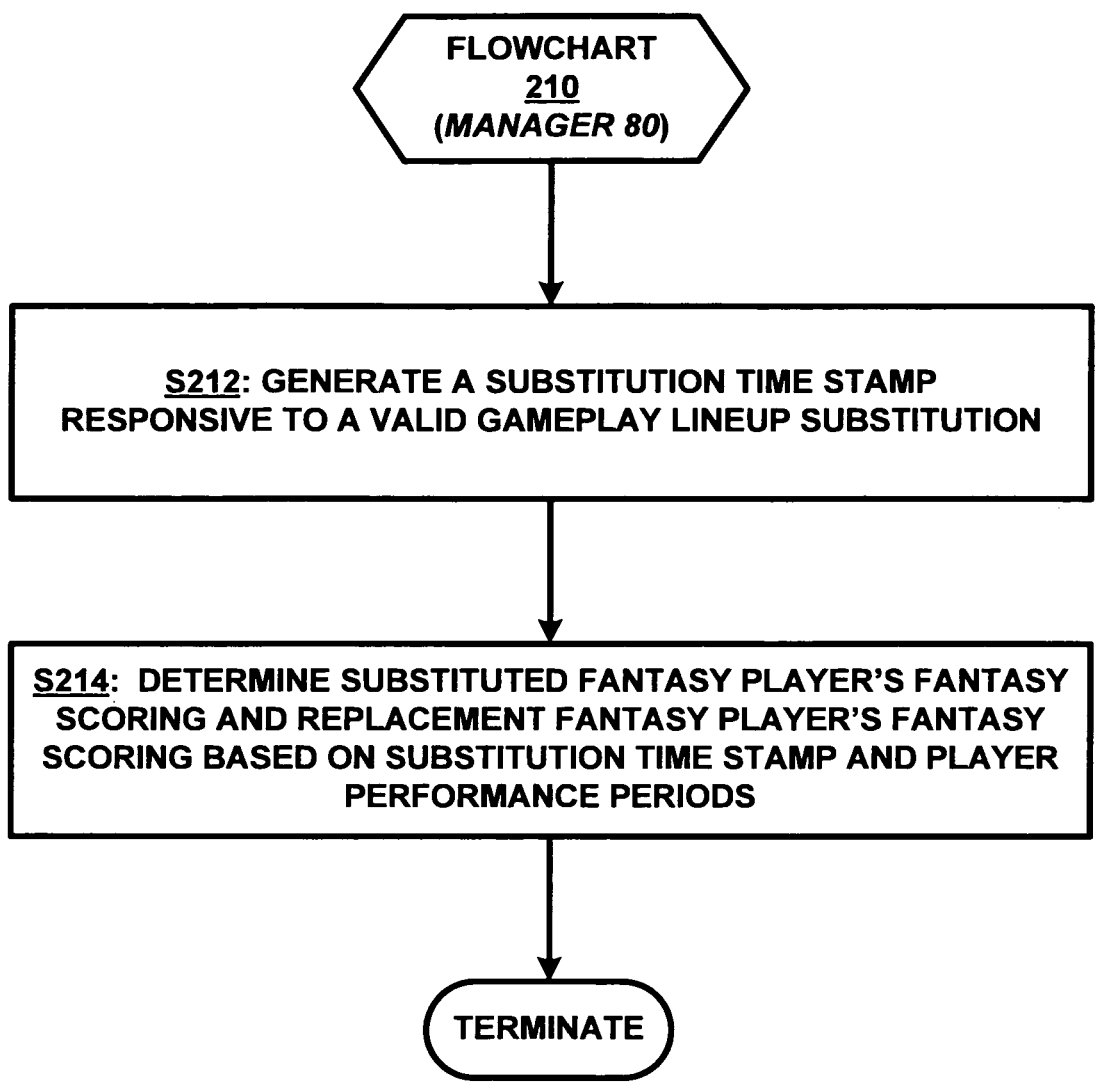
FIG. 12 illustrates a third embodiment of a flowchart representative of a fantasy substitution method in accordance with the present invention.

For purposes of the present invention, the term "substitution indicator" is broadly defined herein as an indication of one fantasy player being substituted in fantasy team lineup by another fantasy player. In one embodiment, as shown in FIG. 12, the substitution indicator is generated by fantasy gameplay manager 80 as a substitution time stamp during a stage S212 of a flowchart 210 in response to a valid gameplay lineup substitution having one fantasy player designated as a substituted fantasy player and another fantasy player designated as the replacement fantasy player. The substitution time stamp can be on based on Greenwich Mean Time ("GMT") or a time related to one or more player performance periods.

A stage S214 of flowchart 210 encompasses fantasy gameplay manager 80 determining a substitute fantasy player's fantasy scoring and a replacement fantasy player's fantasy scoring based on the substitution time stamp and the player's performance periods. For example, if a fantasy client device 20 transacts a replacement of Peyton Manning for Tom Brady at the end of the first quarter of Manning's game as indicated by the substitution time stamp and Brady completed his game, then Manning's scoring will be based on his only quarter of game and Tom Brady's scoring will be based on the $2^{nd}$, $3^{rd}$ and $4^{th}$ quarters of Brady's game. Also by example, if a fantasy client transacts a replacement of Roger Clemens for Randy Johnson at the end of the $1^{st}$ and $2^{nd}$ innings pitched by Clemens as indicated by the substitution time stamp and Johnson completed his game, then Clemens' scoring will be based on his pitched $1^{st}$ and $2^{nd}$ innings and Randy Johnson's scoring will be based on his pitched $3^{rd}$-$9^{th}$ innings. From these two examples, those having ordinary skill in the art will appreciate the many benefits and various simple to complex implementations of the substitution time stamp in accordance with the present invention.

Referring again to FIG. 10, a stage S196 of flowchart 190 encompasses fantasy gameplay manager 80 associates relevant portions of sponsorship information of the subject fantasy players(s) to the relevant portions fantasy player information of the subject fantasy player(s) as previously described herein, particularly in view of sponsorship selection criteria. A stage S184 of flowchart 180 and a stage S198 of flowchart 190 encompasses the intended fantasy client device 20 and fantasy gameplay manger 80 exchanging a fantasy player/team scoring report SCRP.

Figure 13:
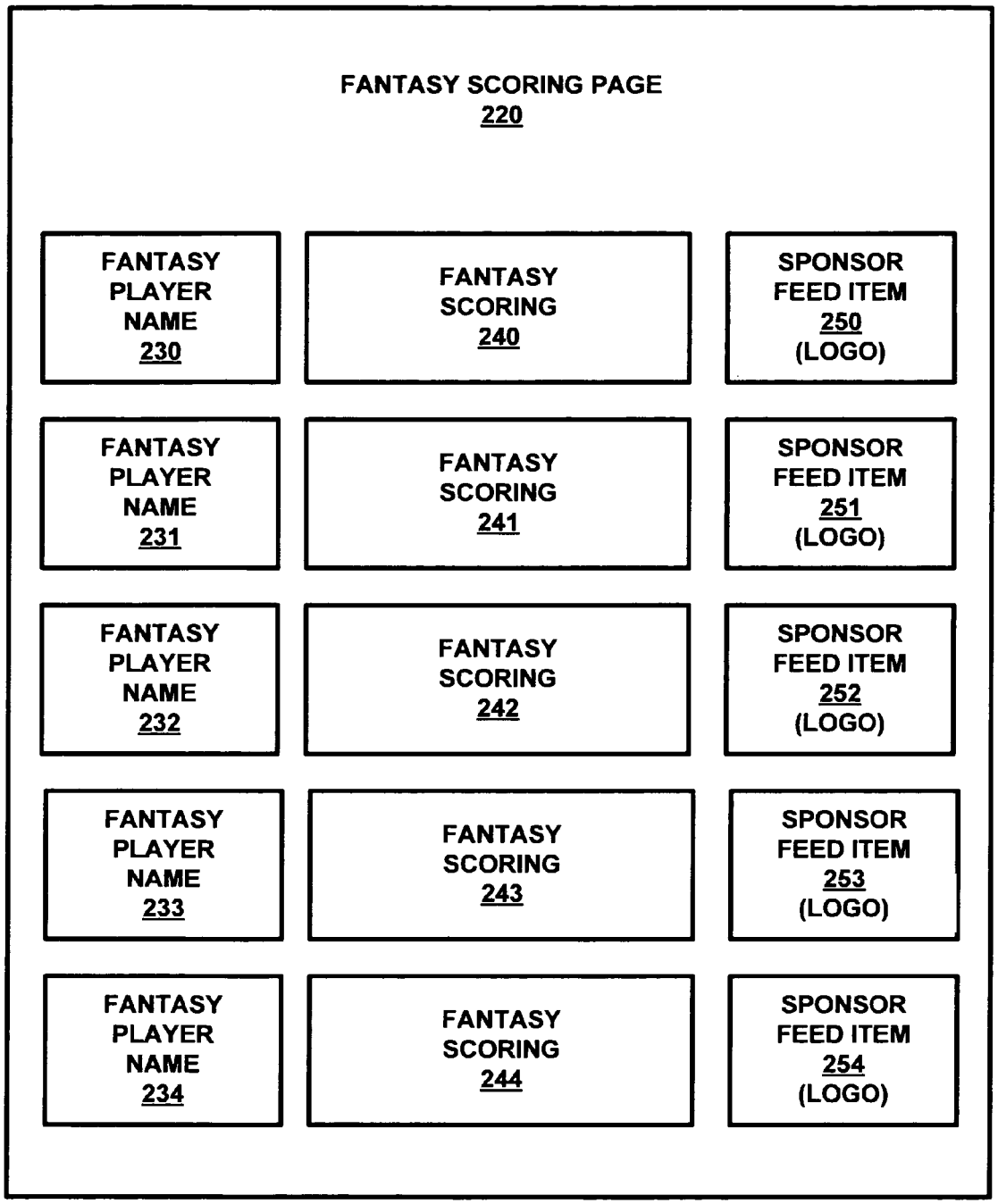
FIG. 13 illustrates a third embodiment of a web page in accordance with the present invention.

FIG. 13 illustrates an exemplary fantasy player/team scoring report SCRP in the form of a webpage 220. As shown, five (5) fantasy players 230-234 with the respective fantasy scoring 240-244 and sponsor logo feed item 250-254 are displayed.

Figure 14:
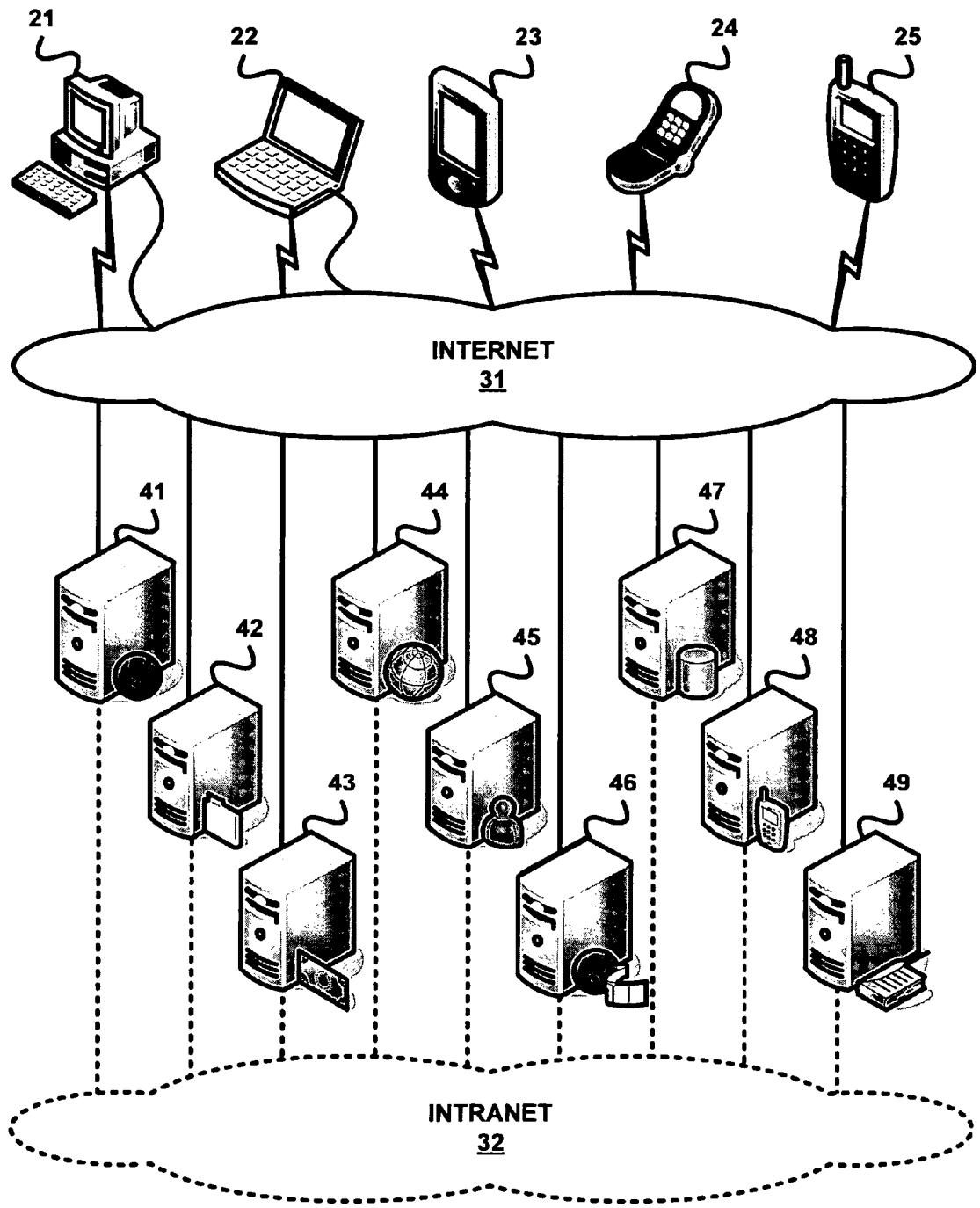
FIG. 14 illustrates exemplary embodiments of fantasy client devices and a fantasy server system in accordance with the present invention.

Referring to FIG. 1, the present invention does not impose any limitations or restrictions to the structural configurations of fantasy client devices 20, network system 30 and fantasy server system 40. FIG. 14 illustrates an example implementation of the network based environment illustrated in FIG. 1. Specifically, five (5) fantasy client devices in the form of a personal computer 21, a laptop 22, a personal data assistant 23, a mobile phone 24 and a smart phone 25 are structurally configured as known in the art to access via an Internet 31 an exemplary array of servers in the form a web server 41, a file server 42, an e-commerce server 43, a content management server 44, a real-time communication server 45, a streaming media server 46, a database server 47, a mobile information server 48 and a directory server 49, which are optionally linked via an Intranet 32. In practice, fantasy player information and sponsorship information are managed by this array of servers 4149, and fantasy content manager 70 and fantasy gameplay manager 80 are embodied as software and/or firmware installed/distributed within one or more of the servers 4149 whereby the processors of servers 41-49 can execute instructions of the software and/or firmware to implement the various inventive principles of the present invention.

Those having ordinary skill in the art will appreciate that the array of servers 41-49 can physically exist as separate hardware platforms or logically exist on a minimum number of hardware platforms. Those having ordinary skill in the art will appreciate that some of the servers 41-49 can be eliminated and/or other types of servers can be added to this array. In one embodiment, web server 41 can individually execute the instructions of fantasy content manager 70 and fantasy gameplay manager 80 while fantasy player information and/or sponsorship information can be managed by file server 42, content management server 44, stream media server 46, and/or database server 47.

Referring to FIGS. 1-14, the present invention does not impose any limitations or any restrictions to the form of fantasy client requests whereby any fantasy client request can invoke action by fantasy content manager 70 and/or fantasy gameplay manager 80. In practice, a fantasy client request can take the form of one of the fantasy client requests described herein, a combination of two or more of the fantasy client requests described herein, or any other form not described herein as would be appreciated by those having ordinary skill in the art.

Furthermore, in some cases, sponsorship information may be not designated to one or more of the fantasy players. During these cases, all requests are executed as taught herein and under the inventive principles of the present invention exclusive of any association of sponsorship information to fantasy player information.

Those having ordinary skill in the art will further appreciate various objects and advantages of the present invention, such as, for example, a realization of a comprehensive sponsorship of fantasy players on an individual basis and/or a team basis with an improved exchange of fantasy content between fantasy client devices 20 and fantasy server system 40.

While the embodiments of the invention disclosed herein are presently considered to be preferred, various changes and modifications can be made without departing from the spirit and scope of the present invention. The scope of the invention is indicated in the appended claims, and all changes that come within the meaning and range of equivalents are intended to be embraced therein.

We claim:

1. A computer readable medium comprising computer executable instructions, which when executed by a computer cause the computer to perform a method comprising:

storing, in the computer readable medium, fantasy player information regarding performance history of one or more real-world athletes selected as fantasy players;

storing, in the computer readable medium, sponsorship information associated with the fantasy player on at least one of an individual basis and a team basis;

receiving a fantasy player recommendation request from a first fantasy client device, said recommendation request designating a second fantasy client device to receive a player recommendation result;

determining the fantasy player recommendation result including at least one item of fantasy player information associated with a recommended fantasy player responsive to said fantasy player recommendation request;

associating at least one item of sponsorship information to the fantasy player recommendation result based at least in part upon said sponsorship information associated with the fantasy player and a sponsorship selection criteria; and transmitting the fantasy player recommendation result and the at least one associated item of sponsorship information to the second fantasy client device.

2. The computer readable medium of claim 1, wherein the fantasy player recommendation result and the at least one associated item of sponsorship information are transmitted to the second fantasy client device at least partially as at least one of feed formatted content and subfeed formatted content.

3. The computer readable medium of claim 1, wherein the sponsorship selection criteria includes event based criteria.

4. The computer readable medium of claim 1, wherein the sponsorship selection criteria includes time based criteria.

5. The computer readable medium of claim 1, the performed method further comprising updating the fantasy player information in real-time based on fantasy player performance information from real-world performance.

6. The computer readable medium of claim 5, the performed method further comprising transmitting the updated fantasy player information to the first fantasy client device.

7. The computer readable medium of claim 6, wherein the updated fantasy player information is transmitted to the first fantasy client device at least partially as at least one of feed formatted content and subfeed formatted content.

8. A computer readable medium comprising computer executable instructions, which when executed by a computer cause the computer to perform a method comprising:

storing, in the computer readable medium, fantasy player information regarding performance history of one or more real-world athletes selected as fantasy players;

storing, in the computer readable medium, sponsorship information associated with the fantasy player on at least one of an individual basis and a team basis;

receiving a fantasy player recommendation request from a first fantasy client device, said recommendation request designating a second fantasy client device to receive a player recommendation result;

determining the fantasy player recommendation result including at least one item of fantasy player information associated with a recommended fantasy player responsive to said fantasy player recommendation request;

associating at least one item of a first sponsorship information to the fantasy player recommendation result based at least in part upon said sponsorship information associated with the fantasy player and a first sponsorship selection criteria; and transmitting the fantasy player recommendation result and the at least one associated item of the first sponsorship information to the second fantasy client device;

receiving a fantasy player transaction request from the second fantasy client device;

determining a fantasy player transaction result including at least one item of fantasy player information responsive to said fantasy player transaction request;

associating at least one item of a second sponsorship information to the fantasy player transaction result based at least in part upon said sponsorship information associated with the fantasy player and a second sponsorship selection criteria; and transmitting the fantasy player transaction result and the at least one associated item of the second sponsorship information to the second fantasy client device.

9. The computer readable medium of claim 8, wherein the fantasy player recommendation result and the at least one associated item of sponsorship information are transmitted to the second fantasy client device at least partially as at least one of feed formatted content and subfeed formatted content.

10. The computer readable medium of claim 8, wherein the first or second sponsorship selection criteria includes event based criteria.

11. The computer readable medium of claim 8, wherein the first or second sponsorship selection criteria includes time based criteria.

12. The computer readable medium of claim 8, the performed method further comprising updating the fantasy player information in real-time based on fantasy player performance information from real-world performance.

13. The computer readable medium of claim 12, the performed method further comprising transmitting the updated fantasy player information to the first fantasy client device.

14. The computer readable medium of claim 13, wherein the updated fantasy player information is transmitted to the first fantasy client device at least partially as at least one of feed formatted content and subfeed formatted content.

15. A computer readable medium comprising computer executable instructions, which when executed by a computer cause the computer to perform a method comprising:

storing, in the computer readable medium, fantasy player information regarding performance history of one or more real-world athletes selected as fantasy players;

storing, in the computer readable medium, sponsorship information associated with the fantasy player on at least one of an individual basis and a team basis;

receiving the fantasy player transaction recommendation request from a first fantasy client device, said transaction recommendation request designating a second fantasy client device to receive a player recommendation result;

determining a fantasy player transaction recommendation result including at least one item of fantasy player information associated with a recommended fantasy player responsive to said fantasy player transaction recommendation request;

associating at least one item of a first sponsorship information to the fantasy player transaction recommendation result based at least in part upon said sponsorship designation information associated with the fantasy player and a first sponsorship selection criteria; and transmitting the fantasy player transaction recommendation result and the at least one associated item of the first sponsorship information to the second fantasy client device;

receiving a fantasy player transaction request from the second fantasy client device in response to the fantasy player transaction recommendation result;

determining a fantasy player transaction result including at least one item of fantasy player information responsive to said fantasy player transaction request;

associating at least one item of a second sponsorship information to the fantasy player transaction result based at least in part upon said sponsorship information associated with the fantasy player and a second sponsorship selection criteria; and transmitting the fantasy player transaction result and the at least one associated item of the second sponsorship information to the second fantasy client device.

16. The computer readable medium of claim 15, wherein the fantasy player transaction recommendation result and the at least one associated item of sponsorship information are transmitted to the second fantasy client device at least partially as at least one of feed formatted content and subfeed formatted content.

17. The computer readable medium of claim 15, wherein the first or second sponsorship selection criteria includes event based criteria.

18. The computer readable medium of claim 15, wherein the first or second sponsorship selection criteria includes time based criteria.

19. The computer readable medium of claim 15, the performed method further comprising updating the fantasy player information in real-time based on fantasy player performance information from real-world performance.

20. The computer readable medium of claim 19, the performed method further comprising transmitting the updated fantasy player information to the first fantasy client device.

* * * * *

UNITED STATES PATENT AND TRADEMARK OFFICE
CERTIFICATE OF CORRECTION

PATENT NO. : 7,762,878 B2
APPLICATION NO. : 11/353920
DATED : July 27, 2010
INVENTOR(S) : Frank C. Nicholas and Ian B. Carswell It is certified that error appears in the above-identified patent and that said Letters Patent is hereby corrected as shown below:

On the title page item 86, should read as follows,

Foreign Priority and PCT Information (PCT)
| Country | Priority | Priority Date |
| --- | --- | --- |
| UNITED STATES OF AMERICA | PCT/US05/27659 | 08-04-2005 |

Signed and Sealed this
Fifth Day of July, 2016

Michelle K. Lee
*Director of the United States Patent and Trademark Office*